US009266387B2

(12) United States Patent
DoVale, Jr. et al.

(10) Patent No.: US 9,266,387 B2
(45) Date of Patent: Feb. 23, 2016

(54) VEHICLE WHEEL DISPLAY ASSEMBLY

(75) Inventors: Anthony J. DoVale, Jr., Roswell, GA (US); Mark Jiang, Four Seasons Garden (CN)

(73) Assignee: STATIC MEDIA, LLC, Roswell, GA (US)

(*) Notice: Subject to any disclaimer, the term of this patent is extended or adjusted under 35 U.S.C. 154(b) by 0 days.

(21) Appl. No.: 12/543,789

(22) Filed: Aug. 19, 2009

(65) Prior Publication Data

US 2010/0170123 A1 Jul. 8, 2010

Related U.S. Application Data

(63) Continuation-in-part of application No. 12/348,643, filed on Jan. 5, 2009, now abandoned.

(51) Int. Cl.

| | |
|---|---|
| ***B60B 7/04*** | (2006.01) |
| ***B60B 7/20*** | (2006.01) |
| ***G09F 21/04*** | (2006.01) |

(52) U.S. Cl.

CPC ................ *B60B 7/20* (2013.01); *G09F 21/043* (2013.01)

(58) Field of Classification Search

CPC .......... B60B 7/00; B60B 7/0026; B60B 7/20; B60B 7/04; B60B 7/06

USPC ............... 301/37.101, 37.102, 37.25, 37.108, 301/37.109

See application file for complete search history.

(56) References Cited

U.S. PATENT DOCUMENTS

| | | | | |
|---|---|---|---|---|
| 1,309,464 | A * | 7/1919 | Dencklau | 40/587 |
| 2,130,220 | A * | 9/1938 | Ball et al. | 40/587 |
| 2,869,262 | A * | 1/1959 | Lucas | 40/587 |
| 2,994,979 | A * | 8/1961 | Shoemaker | 301/37.26 |
| 2,997,344 | A * | 8/1961 | Whiteman | 301/37.25 |
| 4,295,685 | A * | 10/1981 | Spisak | 301/37.42 |
| 5,820,225 | A * | 10/1998 | Ferriss et al. | 301/37.371 |
| 6,048,036 | A * | 4/2000 | Alaoui | 301/37.376 |
| 6,443,529 | B1 * | 9/2002 | Williams | 301/37.25 |
| 6,536,848 | B1 * | 3/2003 | Goodman | 301/37.25 |
| 6,702,396 | B1 * | 3/2004 | Wang | 301/37.25 |
| 6,857,709 | B1 * | 2/2005 | McLean et al. | 301/37.25 |
| 7,121,631 | B2 * | 10/2006 | Strzelczyk | 301/37.25 |
| 7,472,966 | B2 * | 1/2009 | Goodman et al. | 301/37.25 |
| 7,472,967 | B2 * | 1/2009 | DoVale et al. | 301/37.25 |
| 2007/0164600 | A1 * | 7/2007 | Chiu | 301/37.25 |
| 2010/0037498 | A1 * | 2/2010 | Dovale, Jr. | 40/591 |

FOREIGN PATENT DOCUMENTS

| | | | | |
|---|---|---|---|---|
| DE | 3919268 | A1 * | 1/1991 | B60B 7/04 |

* cited by examiner

*Primary Examiner* — Jason Bellinger

(74) *Attorney, Agent, or Firm* — FisherBroyles, LLP; Anthony J. DoVale

(57) ABSTRACT

The present invention relates to a selectively attachable wheel cover for a motor vehicle. The invention comprises a base member and a display member. The base member is selectively secured to the vehicle rim and the display member is rotatably mounted relative to the base member such that it can rotate in relation to the base member and, thus, the vehicle rim. In one aspect, a portion of the display member is sufficiently weighted such that, when the rim rotates (when the vehicle is in motion) the display member remains substantially static.

11 Claims, 21 Drawing Sheets

VEHICLE WHEEL DISPLAY ASSEMBLY

CROSS REFERENCE TO RELATED APPLICATIONS

This application claims priority to and is a continuation in part of U.S. Application No. 12/348,643, which was filed on Jan. 5, 2009 now abandoned, the disclosure of which is hereby incorporated by reference in its entirety.

FIELD OF THE INVENTION

The present invention pertains to a cover for a rim of a motor vehicle. In particular, it pertains to a selectively attachable cover for a rim of a motor vehicle that displays a graphic design that remains substantially stable when the vehicle is in motion.

BACKGROUND OF THE INVENTION

In the automotive industry, consumers are constantly demanding new and innovative aftermarket products to enhance the aesthetic appearance of their vehicle. Over the past few years, the industry has witnessed vehicles being lowered to create what are known as "low riders." There have been vehicles with neon lights installed on the undercarriage, as well as hub caps and rims that remain spinning after the vehicle comes to a resting position.

In the advertising industry, motor vehicles have been a target for inexpensive advertising for years. People use decals on their vehicles to promote products, sports teams, and businesses. Additionally, other forms of advertising are common, such as magnetic signs, banners or flags that attach to a vehicles' window, or simply a bumper sticker.

Some luxury vehicles even have center hubs for their rims that do not rotate even when the vehicle is in motion. Some aftermarket hub caps have been designed to have graphic designs on their outer surface that remain substantially still when the vehicle is in motion. However, these designs have historically been cumbersome to install and are meant to be permanently installed. Some end users, such as sports enthusiasts, are reluctant to use such designs because they only want their vehicle to be advertising their teams' logos on specific days (i.e., game days).

In certain instances, such as advertising, it may be beneficial to have the ability to change graphic designs on the wheel cover without substantial effort on the part of the end user.

SUMMARY

In one embodiment of the invention, a selectively attachable wheel cover for a motor vehicle is exemplified. In one aspect, a hub or wheel cover is provided that is easily and selectively removable. In another aspect, the wheel cover can comprise an outer surface that is configured for displaying graphic designs that do not rotate when the vehicle is in motion. In a further aspect, the wheel cover can comprise a means for allowing easy removal or installation of new graphics or graphical designs.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention.

DETAILED DESCRIPTION OF THE DRAWINGS

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

Figure 16:
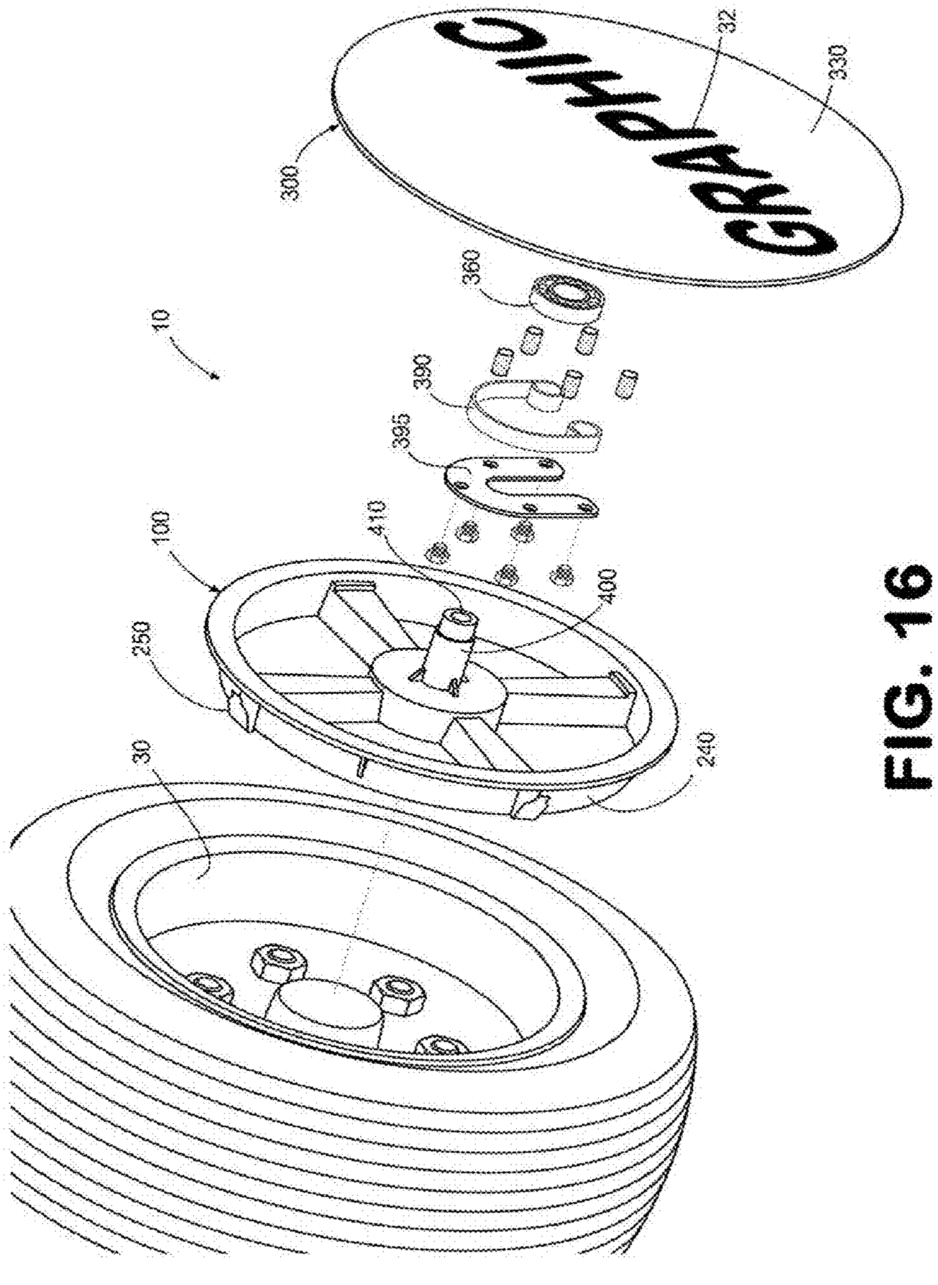
FIG. 16 is a perspective exploded view of an alternative embodiment of the wheel cover, showing a base member and a display member comprising a slot defined by a spring member and an enclosure.
Figure 17:
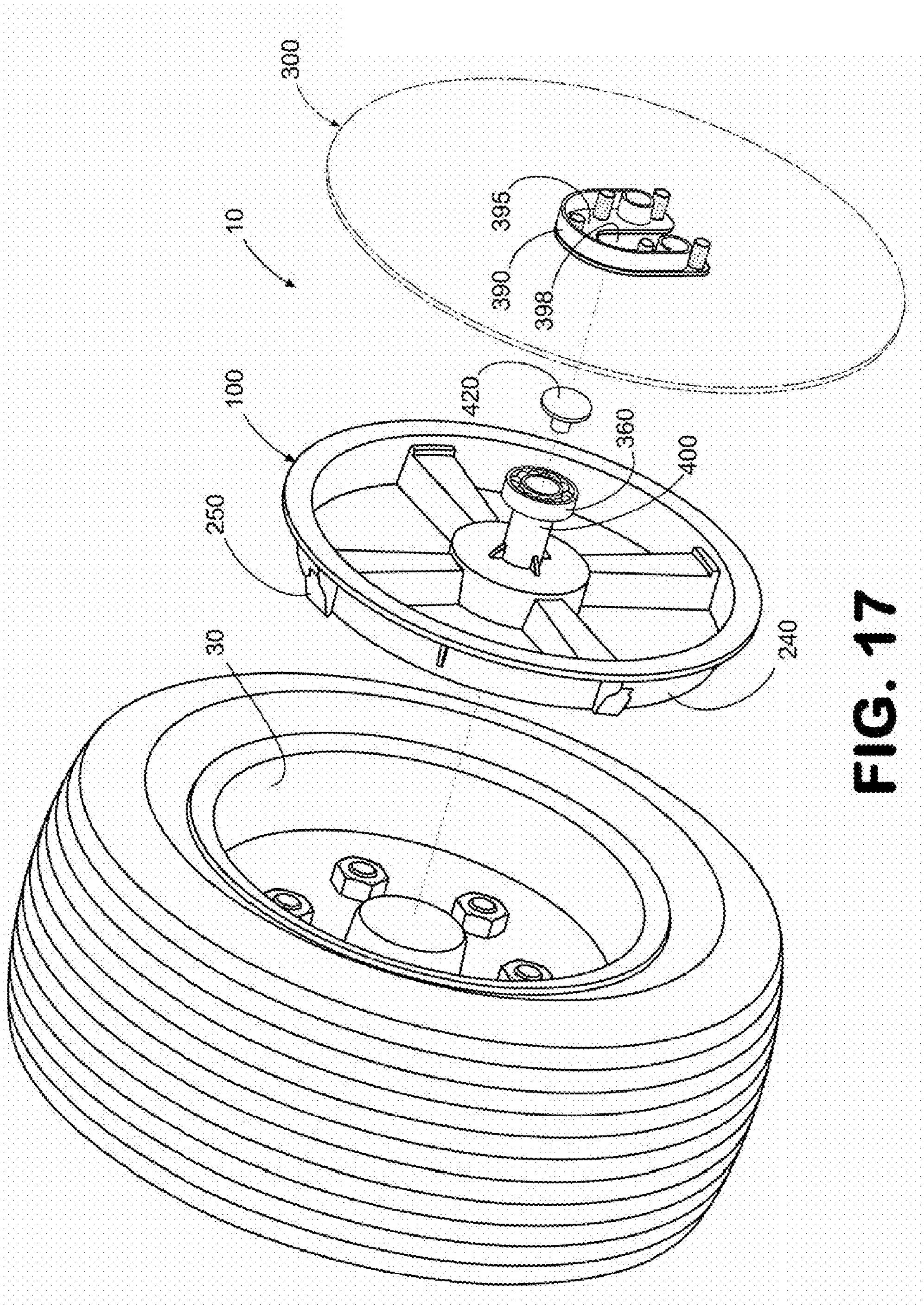

FIG. 17 a perspective view of the wheel cover of FIG. 16, showing the base member in a non-attached position and showing a transparent view of the display member.

Figure 18:
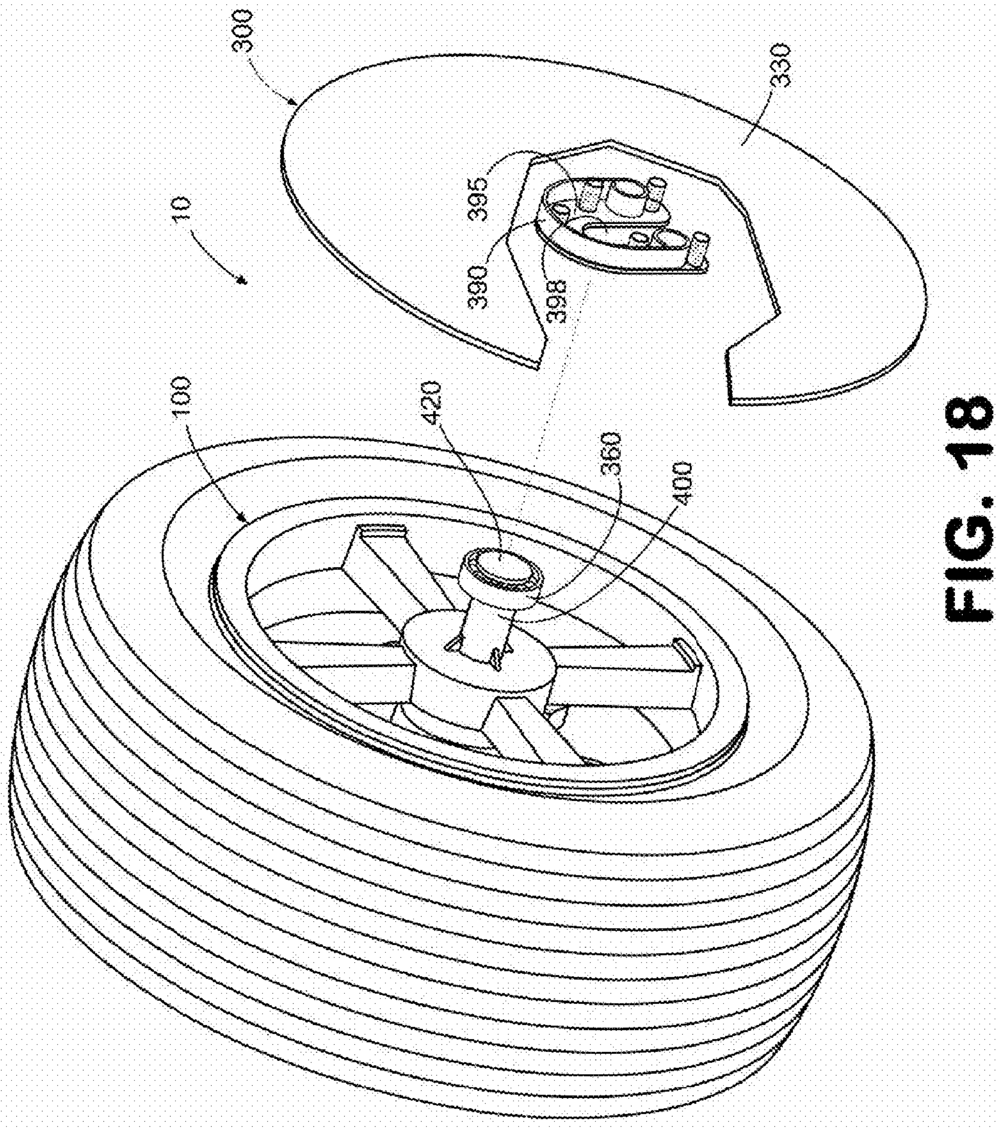

FIG. 18 is a perspective view of the wheel cover of FIG. 16, showing the base member in an attached position and showing a partially cut away view of the display member.

Figure 19:
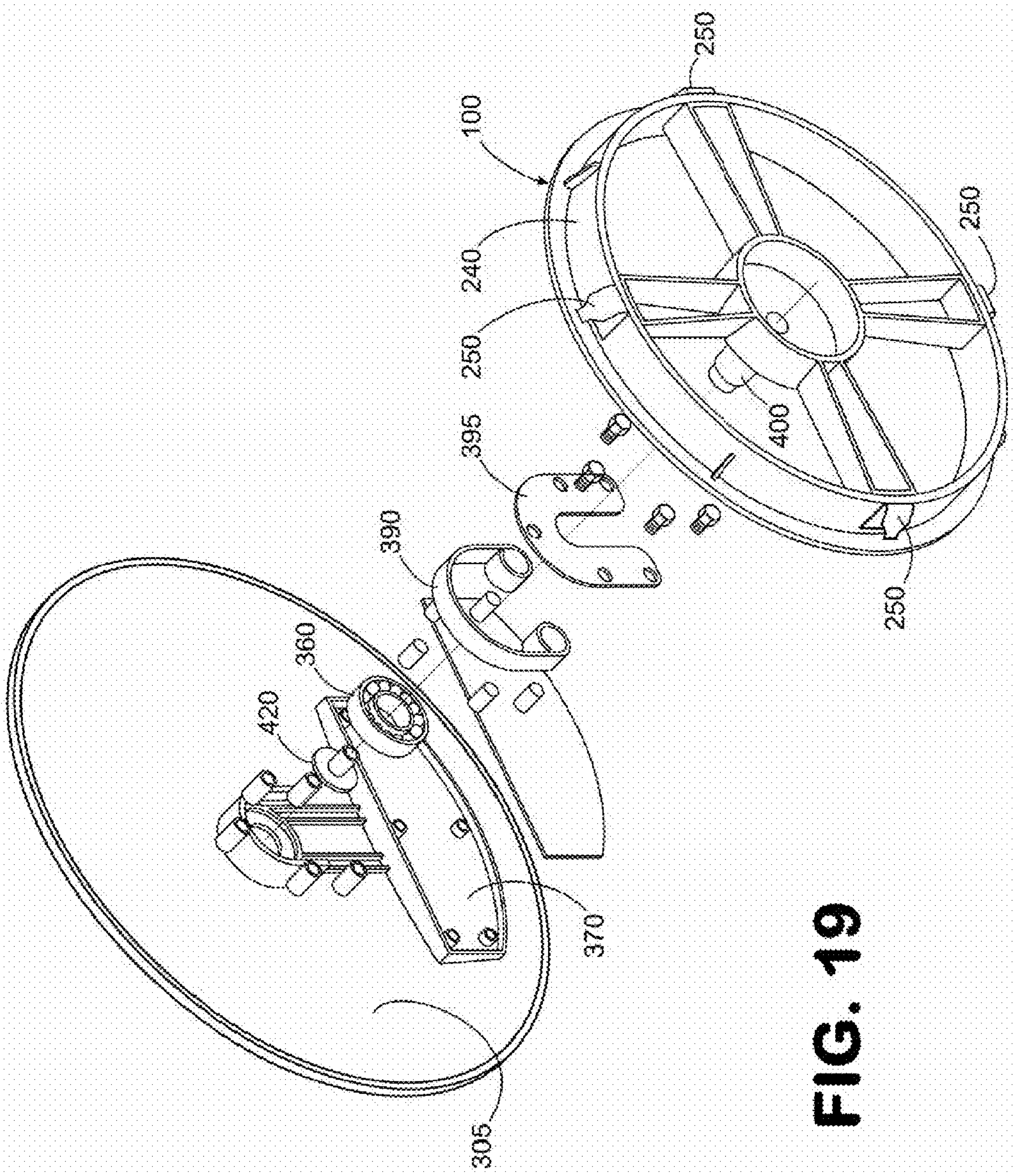

FIG. 19 is a perspective exploded view of the wheel cover of FIG. 16, showing a weight assembly positioned on a lower portion of the rear face of the display member.

Figure 20:
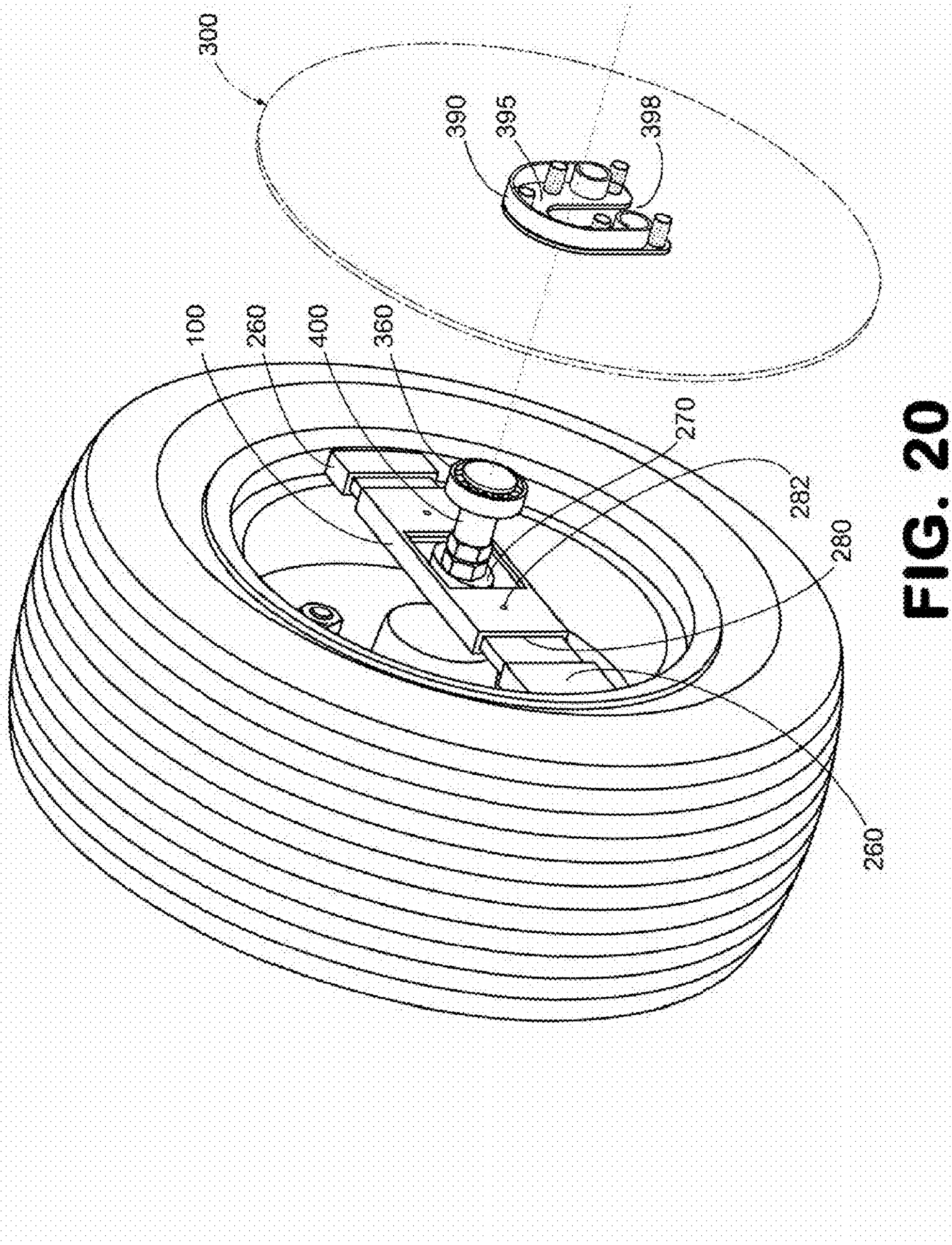

FIG. 20 is an alternate embodiment of the wheel cover, showing a base member comprising a plurality of rods and a cam configured to engage the distal end of each rod.

Figure 21:
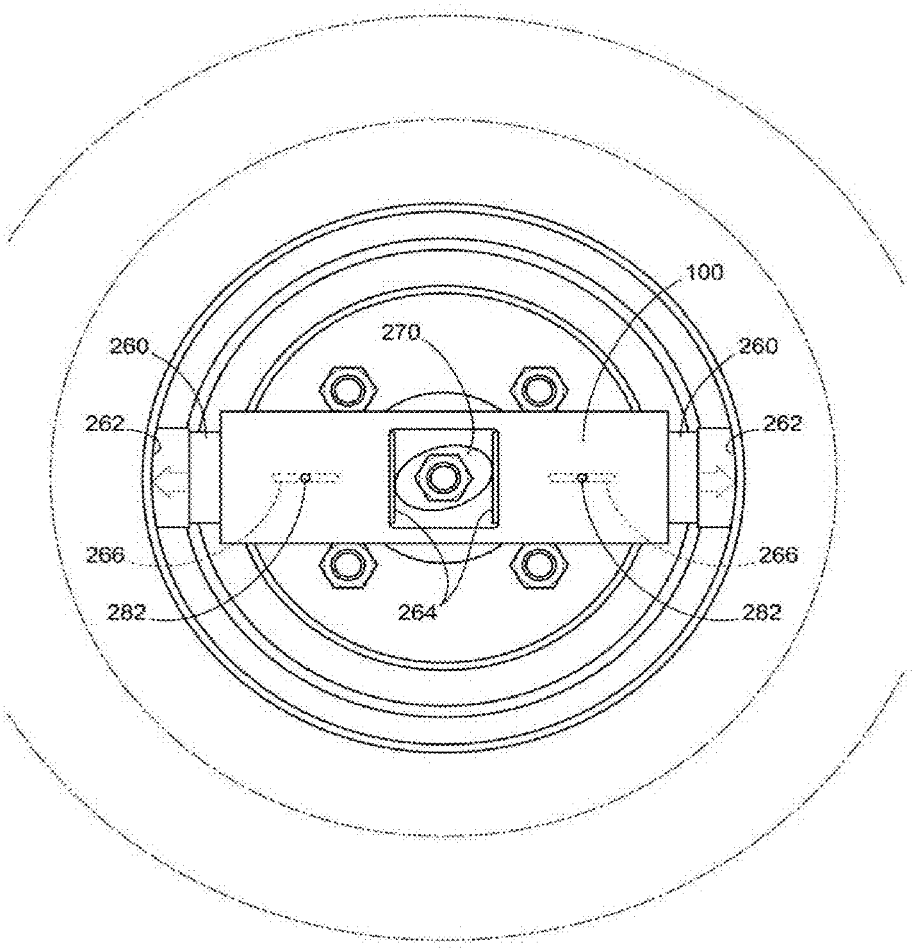

FIG. 21 is a front elevational view of the wheel cover of FIG. 20, showing the base member in frictional engagement with a portion of the wheel of a vehicle.

Figure 22:
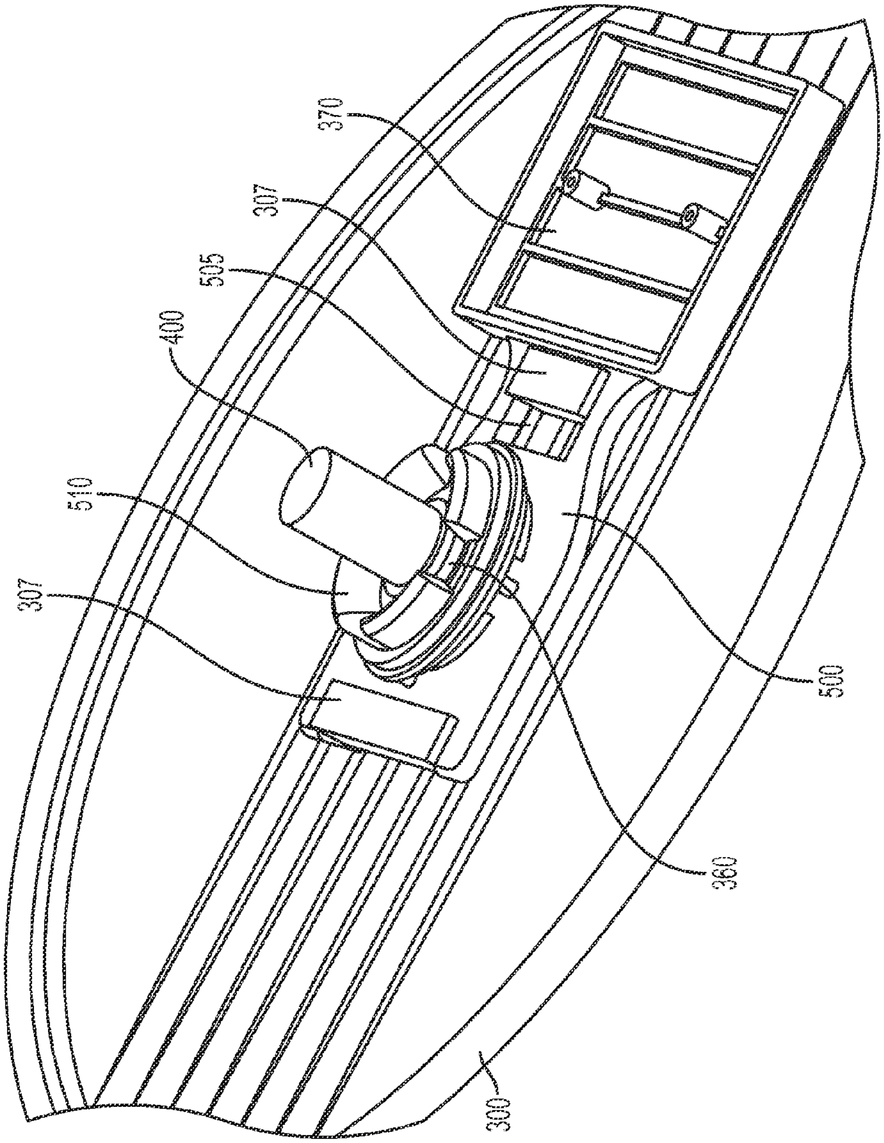

FIG. 22 is a partial perspective view of an alternate embodiment of the wheel cover, showing the weight assembly as part of a coupler.

Figure 23:
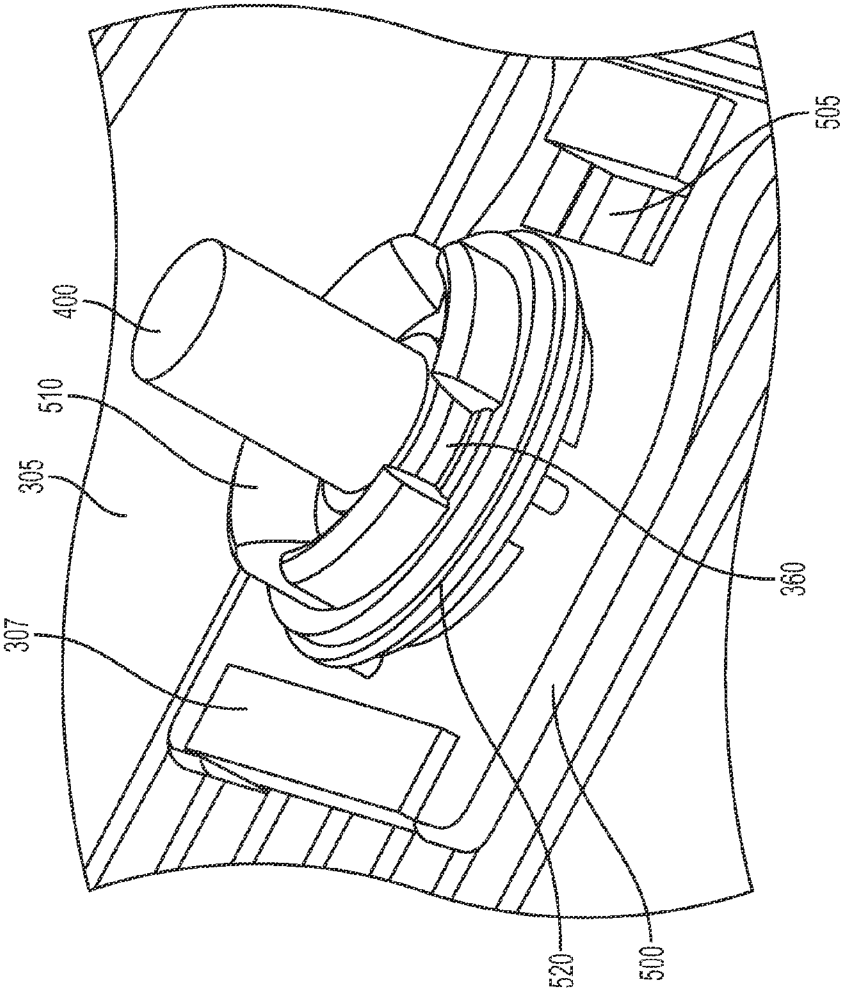

FIG. 23 is a partial perspective view of the coupler of FIG. 22.

Figure 24:
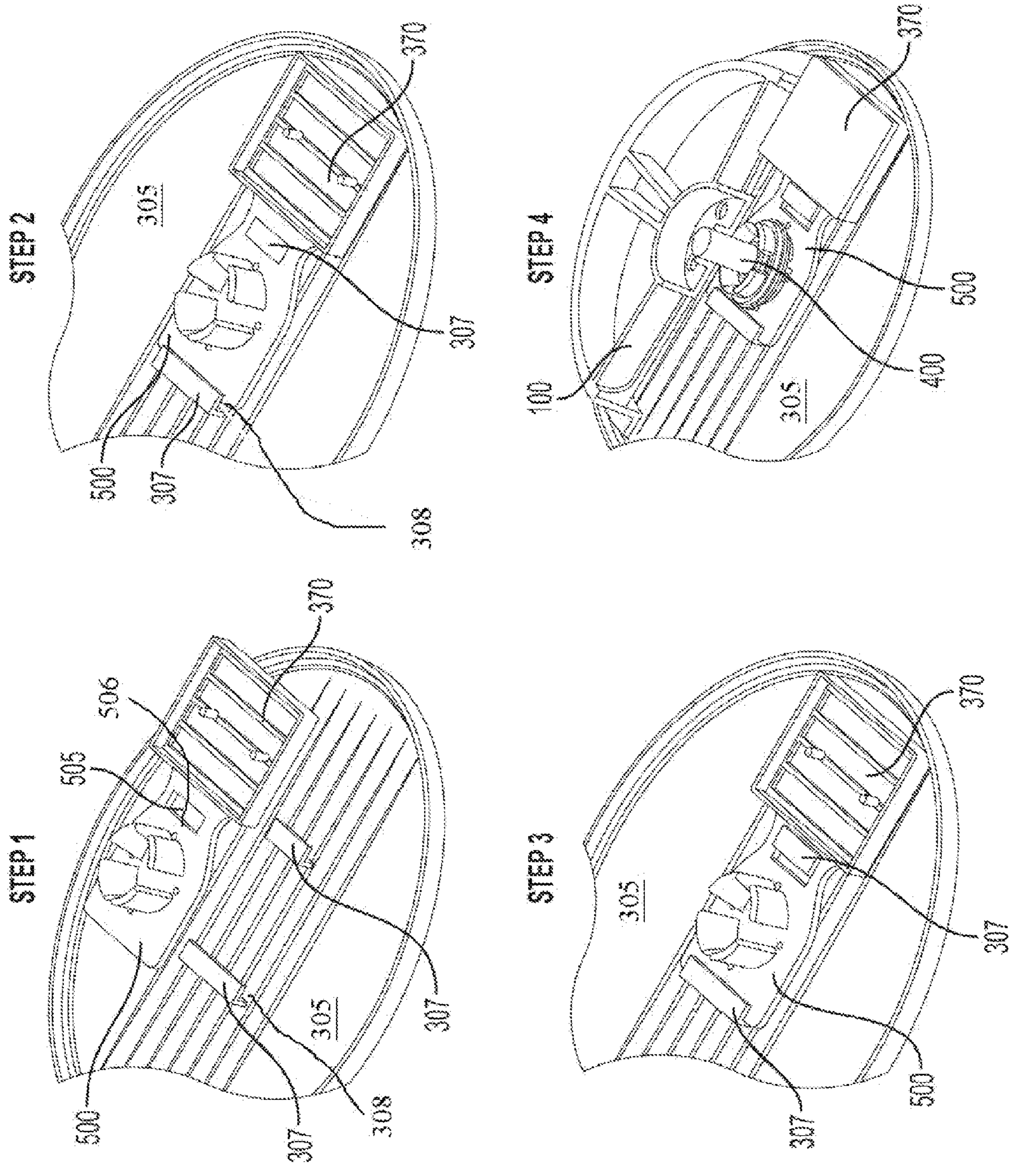

FIG. 24 is a series of drawings of the wheel assembly of FIG. 22, showing the steps of coupling the coupler to the rear face of the display member and to the roller bearing.

DETAILED DESCRIPTION OF THE INVENTION

The present invention may be understood more readily by reference to the following detailed description of the invention and the Examples included therein and to the Figures and their previous and following description.

Before the present systems, articles, devices, and/or methods are disclosed and described, it is to be understood that this invention is not limited to specific systems, specific devices, or to particular methodology, as such may, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used in the specification and the appended claims, the singular forms "a," "an" and "the" include plural referents unless the context clearly dictates otherwise. Thus, for example, reference to "a strap" includes two or more such straps, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

"Optional" or "optionally" means that the subsequently described event or circumstance may or may not occur, and that the description includes instances where said event or circumstance occurs and instances where it does not.

In one embodiment of the present invention, the present invention relates to a selectively attachable wheel cover 10 for a motor vehicle. The term "motor vehicle" comprises automobiles, trucks, golf carts, tractors, trailers, and most any vehicle comprising wheels.

In one embodiment of the present invention, the wheel cover comprises a base member 100, a shaft member 400, and a display member 300. In one aspect, the base member 100 comprises a means for securing the base member to the rim 30 of a motor vehicle. At least in one aspect, it is contemplated that the base member may be releasably secured to the rim of the motor vehicle.

In one aspect, the shaft member 400 is attached to a portion of the base member 100. In operation, when the base member is attached to a rim 30, the shaft member extends substantially transverse relative to the rim. Further, in another aspect, the shaft member extends substantially co-axial to the longitudinal axis of the axle of the vehicle when the base member is attached to the rim. The display member 300 is connected to the shaft member such that it can rotate in relation to the base member and, thus, the rim.

In a further aspect, a portion of the display member comprises a weighted portion that is sufficiently weighted such that, when the rim rotates (i.e., when the wheel of the vehicle is in motion) the display member 300 remains substantially static (i.e. the display member will tend to remain in a substantially upright position during rotation of the wheel). Therefore, a graphic design 320 that is, for example, imprinted thereof the display surface, or is otherwise positioned to appear on the display surface 330 of the display member 300, it would be readily viewed by a person exterior to the vehicle, whether the vehicle were in motion or not. In one exemplary aspect, the display member has a substantially circular or disc shape. In another aspect, the rear face of the display member has substantially a concave shape. In yet another aspect, the display surface of the display member has substantially a convex shape. However, one skilled in the art would appreciate that it is contemplated that the display member can be formed in any select geometric shape, a select advertising slogan shape, a select team logo shape, a select team emblem shape, and the like. The preceding list is exemplary in nature and is not meant to be limiting.

In one exemplary aspect, the base member comprises a front face 110, an opposed back face 120, and a plurality of strap attachment points 150. In another aspect, the base member can further comprise at least one strap in operative communication with at least one of the plurality of strap attachment points 150. This strap may be manufactured from a variety of materials, including, but not limited to, nylon, cotton, twine, and the like. In this exemplified aspect, the strap is configured to engage at least a portion of the rim 30 of the motor vehicle, thereby substantially mounting the base member 100 to a portion of the rim.

In a further aspect, the straps may comprise releasable buckles (not shown) configured to facilitate the easy installation and de-installation of the base member with respect to the rim 30. It is contemplated, however, that many conventional attachment assemblies may be used. Non-limiting examples of such assemblies comprise bungy cords, rope, string, and the like. This type of attachment may be used, for example, with vehicle rims that have spoke-type rims or caps. In this exemplified aspect, the straps 152 can each wrap around one or more spokes and be reattached to themselves using any conventional means. In one aspect, a self-tightening buckle may be used, such as used in common back packs, luggage racks, and the like.

Figure 9:
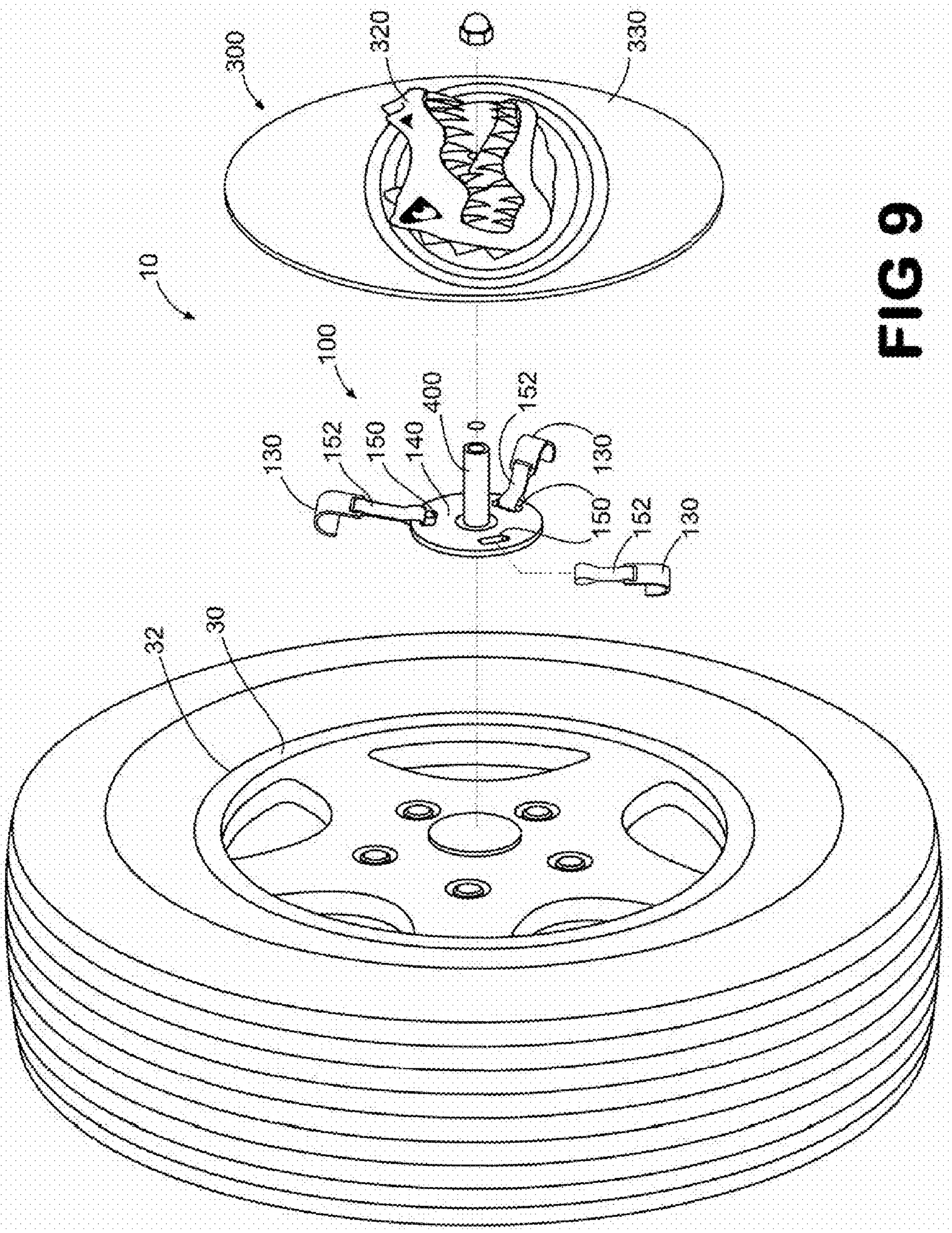
FIG. 9 is an exploded perspective view of one embodiment of the wheel cover, showing a base member comprising a plurality of strap attachment points in communication with a plurality of straps.

In yet another exemplified aspect, as illustrated in FIG. 9, the straps 152 are in operative communication with at least one strap attachment point and are also attached to a mounting device 130. In varying aspects, the mounting device 130 can be a clamp, a hook, or any other conventional mounting mechanism. In this exemplified aspect, the mounting device engages at least a portion of a vehicle rim, thereby substantially mounting the base member 100 to a portion of the rim. This variety of attachment may be used, for example, with rims having a plurality of vent holes thereon the rim 30 or hub cap, substantially near the periphery of the rim 30 or hub cap. One would appreciate that, in the example, the vent holes provide an ample surface to attach the mounting device(s).

In other aspects, as shown in FIGS. 1-8, the base member 100 comprises a body member 140 and a plurality of arm members 180 that extend substantially radially therefrom the body member. In one aspect, the distal ends 182 of the arm members are sized and shaped to engage an outermost portion 32 of a rim 30 of a motor vehicle. In another aspect, the arm members 180 comprise means for extending and retracting such that the base member may be attached to vehicle rims of various diameters. In yet another aspect, the arm members 180 extend from the body member in an equally spaced fashion.

Figure 1:
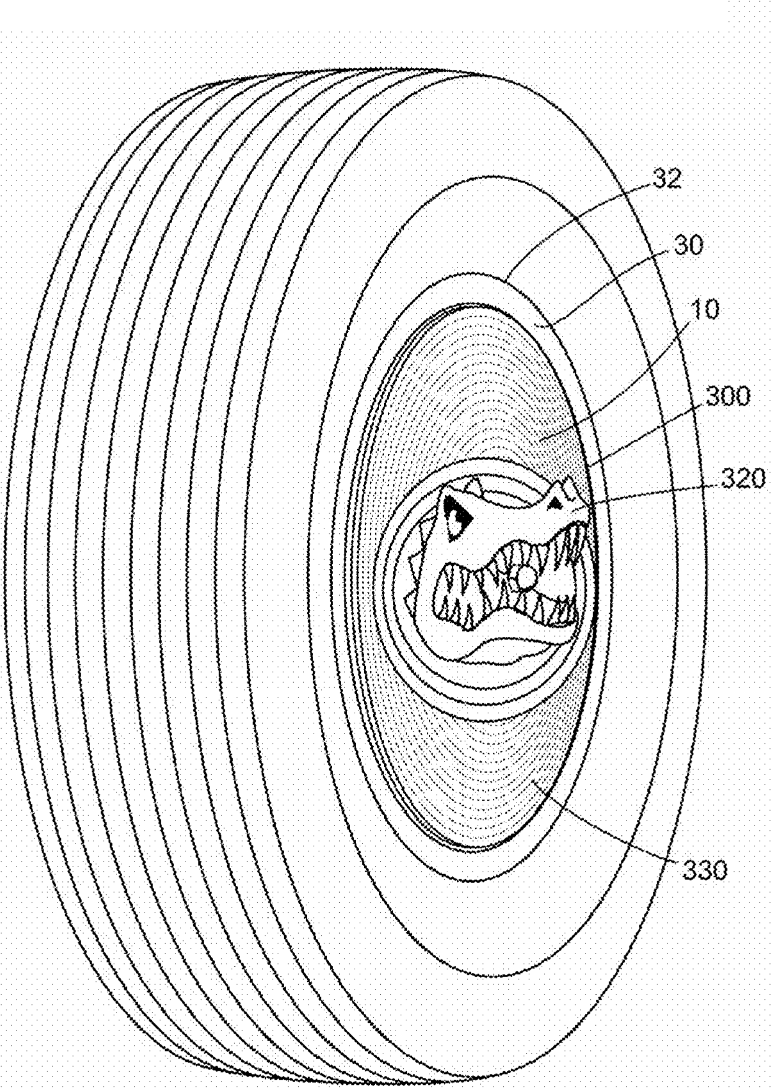
FIG. 1 is a perspective view of one aspect of the present invention for a wheel cover that is shown installed onto a rim of a vehicle.
Figure 2:
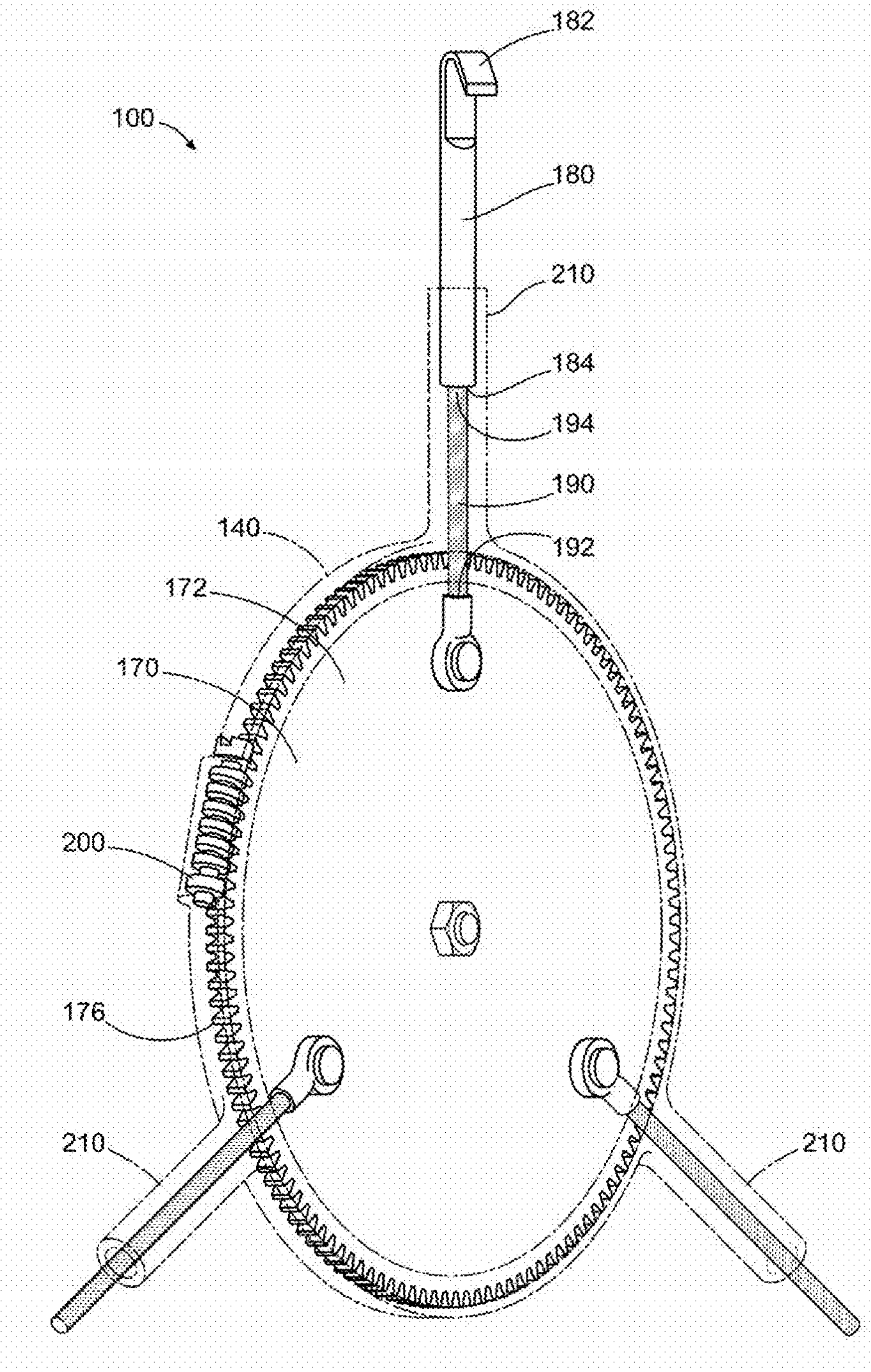
FIG. 2 is a partially transparent rear perspective view of one embodiment of the base member of the wheel cover of FIG. 1, showing an inner disc member, a body member, a plurality of arm members, a plurality of cable members, and a gear member.
Figure 3:
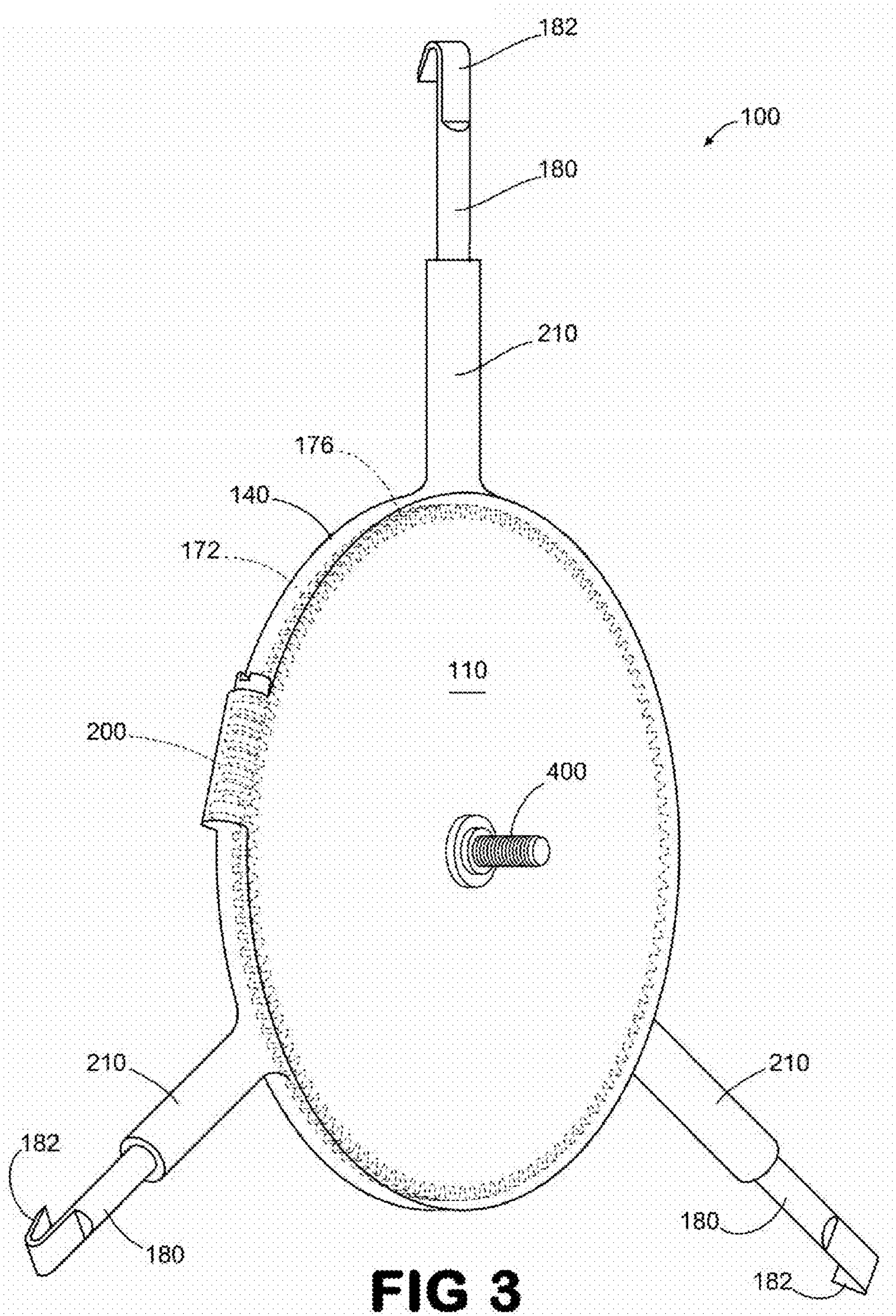
FIG. 3 is a partially transparent front perspective view of the base member of FIG. 2, showing a shaft member.
Figure 4:
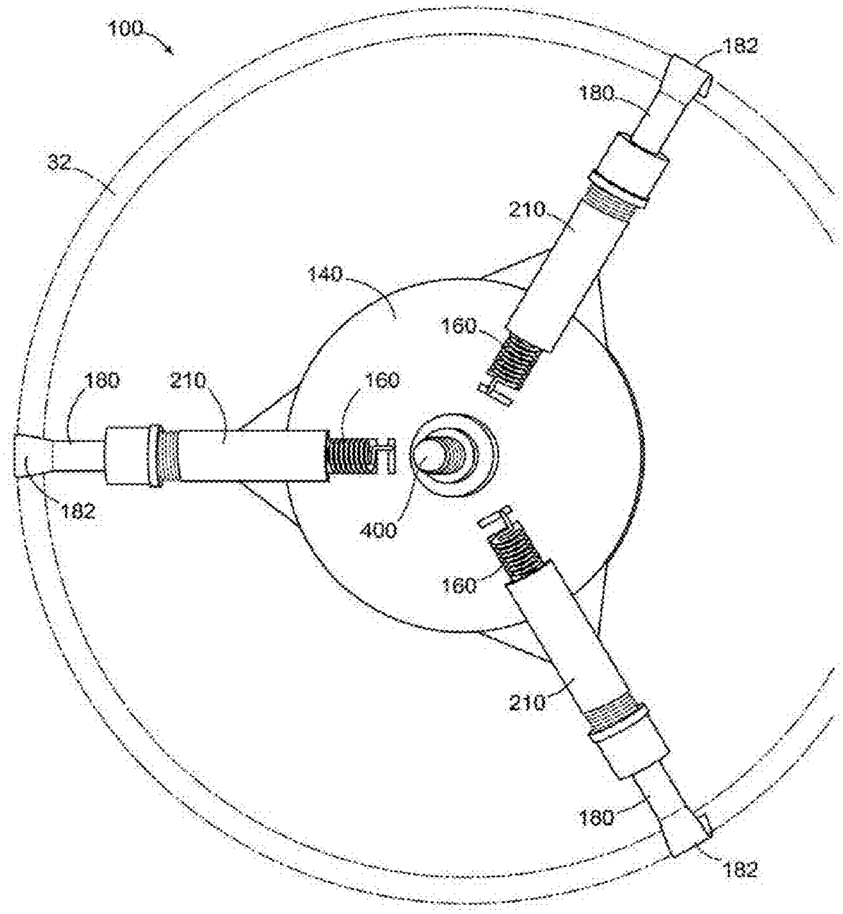
FIG. 4 is a front perspective view of one embodiment of the base member of the wheel cover of FIG. 1, showing a body member comprising a plurality of arm members extending substantially radially therefrom and comprising a plurality of bias elements.
Figure 5:
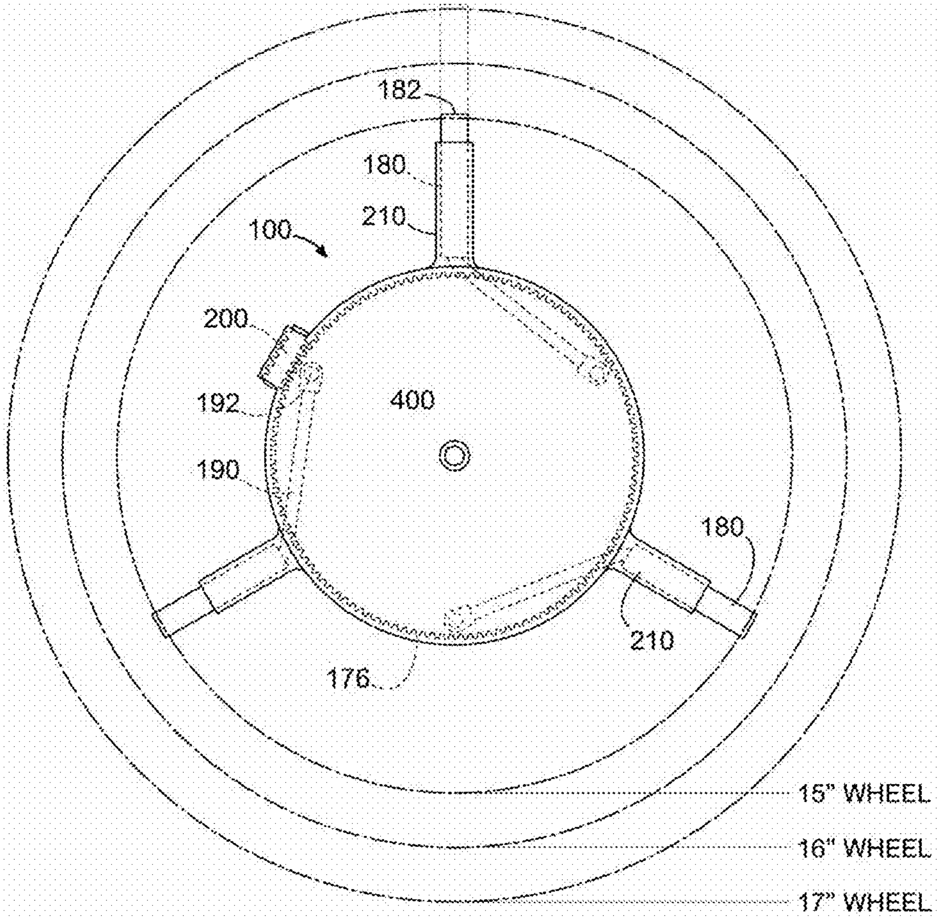
FIG. 5 is a front elevational view of the base member of FIG. 2, showing exemplified aspects of the base member attached to vehicle rims of various sizes.
Figure 6:
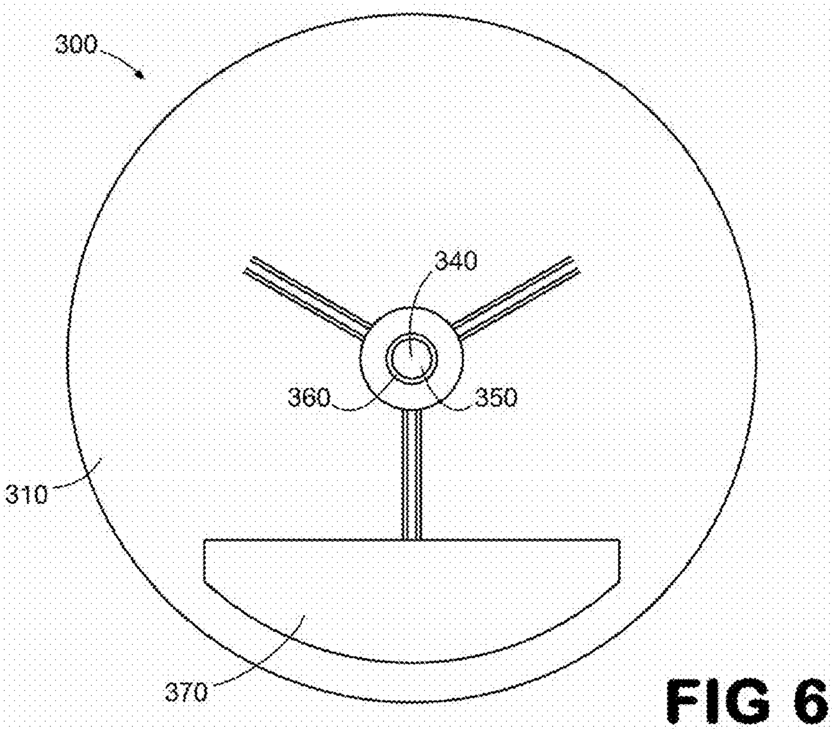
FIG. 6 is a rear elevational view of the display member of the wheel cover of FIG. 1, showing a mass attached substantially on its lower half.
Figure 7:
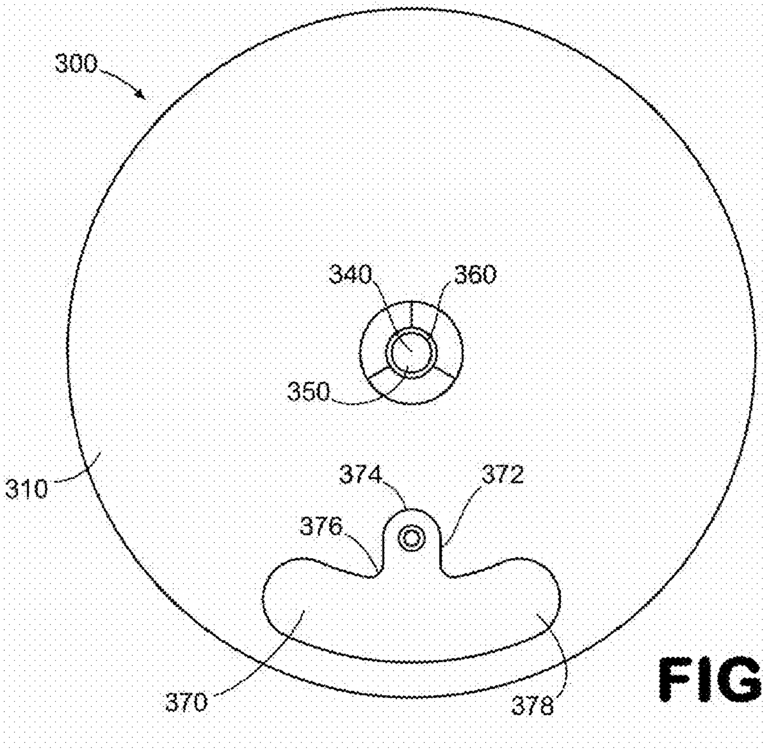
FIG. 7 is a rear elevational view of the display member of the wheel cover of FIG. 1, showing a mass rotationally attached to a lower portion of the display member.

There are several ways in which to accomplish having the arm members 180 extend and retract. One example, and not meant to be limiting, is to incorporate the use of a bias device 160, such as a spring, as can be seen in FIG. 4. In this aspect, the tension on the spring should be sufficient to securely attach the base member. Other examples may include the use of bungy cords, spring steel, or other retractable material.

In yet another aspect, the base member 100 comprises an inner disc member 170, a body member 140, a plurality of arm members 180, a plurality of cable members 190, and a gear member 200. In this aspect, at least a portion of the peripheral edge 172 of the inner disc member 170 comprises a toothed surface 176.

In this aspect, the body member 140 substantially houses the inner disc member 170 and further comprises a plurality of radially extending tubular members 210. In one aspect, the tubular members extend from the body member in an equally spaced fashion. The arm members 180 are slidably disposed therein the tubular members 210 and the distal ends 182 of each of the arm members 180 are sized and shaped to engage a portion the vehicle rim 30. In one aspect, the arm members are configured to engage an outermost portion 32 of the vehicle rim. In various exemplified embodiments, it is contemplated that the distal ends of the arm member form hooks, clasps, or other conventional attachment devices.

In this aspect, the first end 192 of each of the cable members 190 is affixed to a portion of the inner disc member 170. The second end 194 is affixed to the proximal end 184 of the arm member (the end that is not engaged with the rim of the vehicle). Of course, it is contemplated that the arm member and the cable member can be an integral member.

In one aspect, the gear member 200 described above is disposed thereon a circumferential surface 142 of the body member. It is sized and shaped to engage the toothed surface of the inner disc member such that it acts like a drive gear. In this aspect, rotation of the gear member 200 in a first direction rotates the inner disc member, which pulls the cable members 190 therethrough the tubular members 210 and retracts the arm members. In operation, this retraction of the arm members (with the distal ends of the respective arm members mounted to portions of the vehicle rim) draws/tightens the base member onto the rim 30. In one aspect, the cable members are pulled therethrough the tubular members at the same rate, thereby self-centering the base member on the rim.

Conversely, rotation of the gear member in a second direction, opposite to the first direction, rotates or translates the inner disc member 170 in an opposite direction, which loosens the cable members 190 and enables the arm members 180 to be loosened, or extended. Thus, by having the arm members with the capability of extending and retracting, the base member may be installed on rims of varying diameters.

Figure 8:
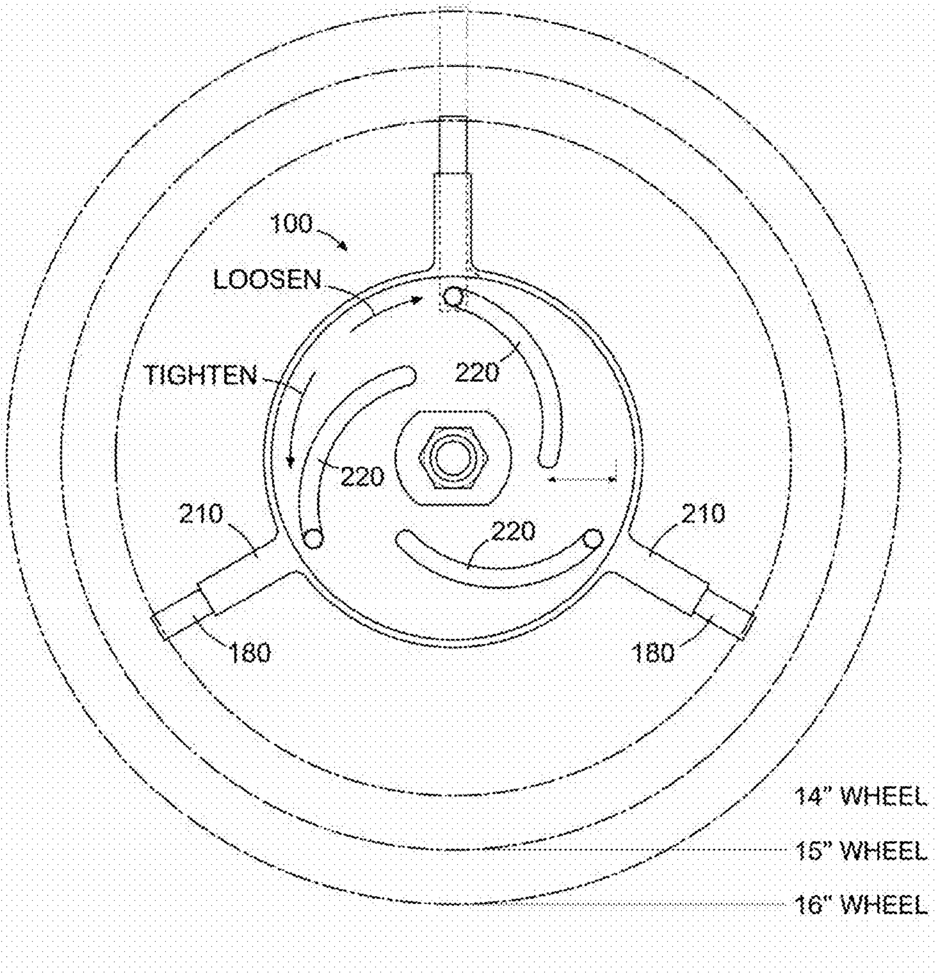
FIG. 8 is front elevational view of one embodiment of the base member of the wheel cover of FIG. 1, showing a plurality of cam surfaces.

In still another aspect, as illustrated in FIG. 8, the base member comprises an inner disc member 170, a body member 140, a plurality of arm members 180, and plurality of cable members 190. In this aspect, the inner disc member 170 comprises a plurality of cam surfaces 220.

Similar to the previous aspect, the body member substantially houses the inner disc member and further comprises a plurality of radially extending tubular members 210. The arm members are slidably disposed therein the tubular members and the distal ends 182 of each of the arm members are sized and shaped to engage an outermost portion 32 of a rim 30 of a motor vehicle. As mentioned above, in various aspects, the distal ends of the arm members can form hooks, clasps, or the like.

In this embodiment, the first end 192 of each of the cable members is slidably engaged with a cam surface 220 of the inner disc member 170. The second end 194 is affixed to the proximal end 184 of the arm member (i.e., the end that is not engaged with the rim of the vehicle). When the user rotates the inner disk in a first direction, the camming action of the cam surface 220 against the ends of the cable members pulls the cable members 190 therethrough the tubular members and retracts the arm members 180. One would appreciate that, this action tightens the base member 100 onto the rim. Conversely, rotation of the inner disc member in a second direction loosens the cable members and enables the arm members to be loosened, or extended. As mentioned above, by having the arm members with the capability of extending and retracting, the base member may be installed on rims of varying diameters. In one aspect, the cable members are pulled therethrough the tubular members at the same rate, thereby self-centering the base member on the rim.

Figure 10:
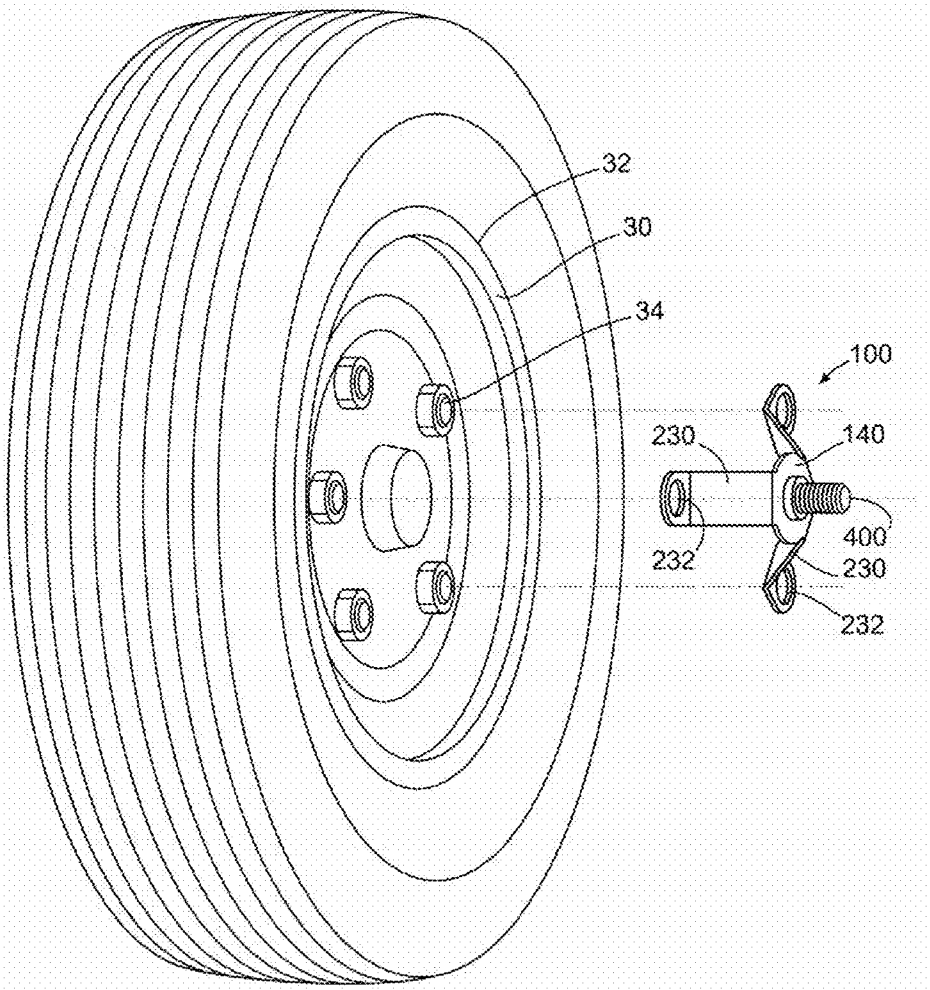
FIG. 10 is a perspective view of one embodiment of the base member that comprises a body member with a plurality of bracket members.

In yet another embodiment, as is illustrated in FIG. 10, the base member comprises a body member 140 that has a plurality of bracket members 230. In one aspect, the bracket members 230 extend substantially therefrom the peripheral edge 144 of the body member. In another aspect, it is contemplated that the bracket members can be uniformly spaced from each other. In another aspect, at least two bracket members comprise distal ends 232 that each defines an opening that is constructed and arranged to allow insertion of a threaded lug shaft 34 extending therethrough the vehicle rim. Where the above described aspects may be attached to virtually any rim 30, this exemplary aspect is primarily designed for rims without ornate rims or hub caps, such as commercial vehicles.

Referring now to FIGS. 16-21, in one exemplary aspect, the peripheral edge surface 240 of the base member is configured for a friction fit with a portion of the wheel of the motor vehicle such that the base member 100 can be selectively and non-rotatably attached to the wheel of the motor vehicle. In one aspect, the base member fits much like a traditional hubcap, comprising one or more bias elements 250 mounted to the peripheral edge surface 240 of the base member, such that the bias element 250 is configured for a friction fit with a respective portion of the wheel. However, as one skilled in the art can appreciate, many other variations of the friction fit are possible.

As illustrated in FIGS. 20-21, in another exemplary embodiment, the base member comprises at least one rod 260 and a cam 270 configured to engage the distal end 262 of the rod 260. In this aspect, selective rotation of the cam 270 moves the rod between a non-engaged position and an engaged position. In the engaged position, the proximal end 264 of the rod 260 extends beyond the peripheral edge surface of the base member 100 and into frictional engagement with a portion of the wheel of the vehicle.

In one aspect of this embodiment, the base member further comprises at least one sleeve 280 configured for slidable receipt of one respective rod 260. The illustrations in FIGS. 20-21 show one exemplary aspect, where the base member 100 comprises two sleeves 280, each configured for slidable receipt of a rod 260. As one skilled in the art can appreciate, almost any number of combinations of sleeves and rods would suffice. In another aspect, as illustrated in FIGS. 20-21, the sleeve(s) may comprise a bore therethrough configured to accept a retaining pin 282. In this aspect, the rod(s) 260 may comprise a complimentary slit 266 configured to permit translation of the rod, while retaining the rod 260 substantially within the sleeve 280.

It is contemplated that the base member, in any aspect, may be manufactured with a variety of materials. Non-limiting examples would include aluminum, plastic, steel, rubber, composite, ceramic, and wood. Similarly, the display member 300 may be manufactured with a variety of materials, such as plastic, rubber, aluminum, etc.

In one aspect, the base member 100 is circularly shaped. However, it is contemplated that any geometric shape could be used, such as, but not limited to, triangular, square and the like.

In one aspect, the shaft member 400 of the present invention is rotably mounted substantially near its proximal end to the base member and it extends substantially perpendicularly therefrom. In a further aspect, a least a portion of the distal end of the shaft member 400 may have a threaded surface. In this aspect, the display member can be secured to the shaft member using a common bolt with or without a washer. It is contemplated, however, that any conventional means for securing the display member to the shaft member may be used.

In another aspect, the shaft member has a keyed end portion (not shown) at its distal end. In this aspect, the center 340 of the display member defines a bore 350 shaped to engage the keyed end portion of the distal end 410 of the shaft member. Thus, the display member remains substantially constant and does not rotate with respect to the shaft member 400 while the base member is free to rotate with respect to the shaft member 400 and the display member. As one skilled in the art will appreciate, in order to maintain contact between the display member and the shaft member, the distal end of the shaft member may have a bore through which the user may engage a conventional attachment device, such as, for example and not meant to be limiting, a cotter pin and the like.

In one exemplary aspect, the shaft member 400 is rotably mounted to the base member using a roller bearing apparatus. However, any type of conventional bearing system will work. In fact, the base member 100 may define a bore through which the shaft member may engage the base member, such that, with sufficient lubrication, the base member would be rotably mounted without the need for a bearing system.

In another embodiment of the invention, as illustrated in FIGS. 2-5, and 8-10, the shaft member is mounted to the base member in substantially a fixed relationship with the base member 100. In one exemplary aspect, the display member is configured to be rotably mounted to a portion of the distal end of the shaft member. In this aspect, as one will appreciate, both the shaft member and the base member rotate with respect to the display member, which remains substantially static.

In one aspect of this embodiment, substantially the center portion 340 of the display member defines a bore 350 configured to engage the distal end 410 of the shaft member 400. In another aspect, the display member is rotably mountable to the shaft member using a roller bearing 360 apparatus. As mention above, any type of conventional bearing system will work. Similarly, the display member may engage the shaft member without a bearing system, and with sufficient lubrication, the display member would be rotatable around the shaft member.

In yet another exemplary embodiment, as illustrated in FIGS. 16-21, the shaft member 400 extends outwardly from a center portion of the base member 100, and a roller bearing 360 is mounted to a distal portion 410 of the shaft member 400. In one aspect, the roller bearing 360 may be press-fit onto the shaft and held into place by an end cap 420.

In one aspect of this embodiment, as illustrated in FIGS. 16-19, the display member 300 comprises a spring member 390 and an enclosure 395 mounted to a center portion of the rear face 305 of the display member. In this aspect, the spring member 390 and enclosure 395 define a slot 398 for acceptance of the roller bearing. The spring member is mounted therein the enclosure and is configured to selectively bias to receive the roller bearing 360. Once the roller bearing is positioned therein the enclosure, the spring member 390 is configured to hold it into place.

In another aspect of this embodiment, the weight assembly 370 is spaced from the enclosure 395. Spacing the weight assembly from the enclosure enables easier ingress and egress of the roller bearing 360 into and out of the enclosure. In one aspect, the slot 398 defined by the spring member 390 and the enclosure 395 substantially faces the lower portion of the display member 300. In this fashion, gravity assists holding the roller bearing within the enclosure, which results in a more secure mounting of the display member thereon the shaft member 400 via the roller bearing 360.

The shaft member 400 may comprise any material sufficiently strong to withstand tangential forces applied thereon by the weight of the display member and wind resistance. Some examples may be steel, iron, aluminum, plastic, or any other substantially rigid substance known in the art.

As stated above, the display member also comprises a weight assembly 370 substantially positioned thereon a lower portion of the display member. In one aspect, the weight assembly 370 is mounted thereto a lower portion of the rear face 305 of the display member. One skilled in the art will appreciate that there are a multitude of different convention methodologies that are suitable to weight the display member. A non-limiting example would comprise embedding or encasing a substance within the display member itself, such as, but not limited to, steel, concrete, lead, or any other sufficiently heavy material. Another non-limiting example would comprise attaching a substance to the rear face 305 of the display member itself, such as, but not meant to be limiting, steel, concrete, lead, or any other sufficiently heavy material.

In another aspect, the display member can further comprise a pivot pin that is mounted substantially on the lower half or portion of the display member. In this aspect, the weight assembly 370 is attached to the pivot pin. Thus, the weight can move freely with respect to the display member, which, inherently, provides a dampening effect for the motion of the display member.

In one aspect, the weight assembly 370 has an elongate body 372 with a proximal end 374 and a distal end 376. Here, the proximal end 374 is rotably mounted to the pivot pin. In this aspect, a mass 378 is attached to the distal end 376 of the body 372 at a distance from the pivot pin. In operation, the oscillation of the display member caused by the acceleration and deceleration of the vehicle is substantially reduced.

In use, the base member, with the shaft member, is mounted to the rim 30 or hub cap of the rim using the aforementioned systems and methods. After the base member is secured, the display member is mounted thereon the shaft member.

In another aspect, as shown in FIGS. 22-24, the display member can be coupled to the base member using a coupler 500 to rotatably and selectively couple the display member 300 to a distal portion of the shaft member 400. In one aspect, the coupler 500 comprises the weight assembly 370, which moves it from the display member and, thus, makes the display member less expensive. In this aspect, the coupler is selectively coupled to the roller bearing, as shown in FIG. 22 and, thus, remains stable with the display member as the base member rotates with the wheel.

In one aspect, the coupler comprises an enclosure 510 configured for frictional receipt of the roller bearing. As can be seen in FIGS. 22-24, the enclosure can substantially encompass the periphery of the roller bearing and is configured to "snap" onto the roller bearing, as shown. In another aspect, and for further security, the coupler further comprises a retainer band 520 substantially circumferentially surrounding the enclosure for retention of the roller bearing within the enclosure. As can be seen in the figures, in this aspect, the enclosure is spaced from the weight assembly, which aids in the counter-weight function.

In one aspect, the coupler is configured for selective mating relationship with a portion of the rear face of the display member. For example, and not meant to be limiting, the rear face 305 of the display member 300 can comprise a pair of elongate L-beams 307 defining channels 308 with portions of the rear face of the display member, the channels configured to receive a portion of the coupler 500. In turn, the coupler can define an opening 505 having edge portions 506 to be received by one of the channels. This configuration is illustrated in FIGS. 22-24.

As one skilled in the art would appreciate, graphic designs may be placed on the display surface 330 of the display member 300 in any number of fashions. In one aspect, the graphic designs are adhered to the display member using conventional adhesive decals comprising, for example, vinyl. In another aspect, the graphic designs may be printed using a variety of processes, including but not limited to screen printing, stamping, digital imaging, and dye sublimation. Alternatively, as one skilled in the art can appreciate, the graphic designs may be molded directly into the display member or they may be printed on a melamine layer and adhered to the display surface.

In yet another embodiment and referring to FIGS. 11-15, the graphic designs may be imprinted onto a display cover 380, which is, in one exemplary aspect, configured to substantially overly at least a portion of the display surface of the display member. The graphic designs may be imprinted on the display cover 380 in almost any conventional manner, including but not limited to, screen printing, dye sublimation, digital printing, in-mold decoration, and the like.

Figure 13:
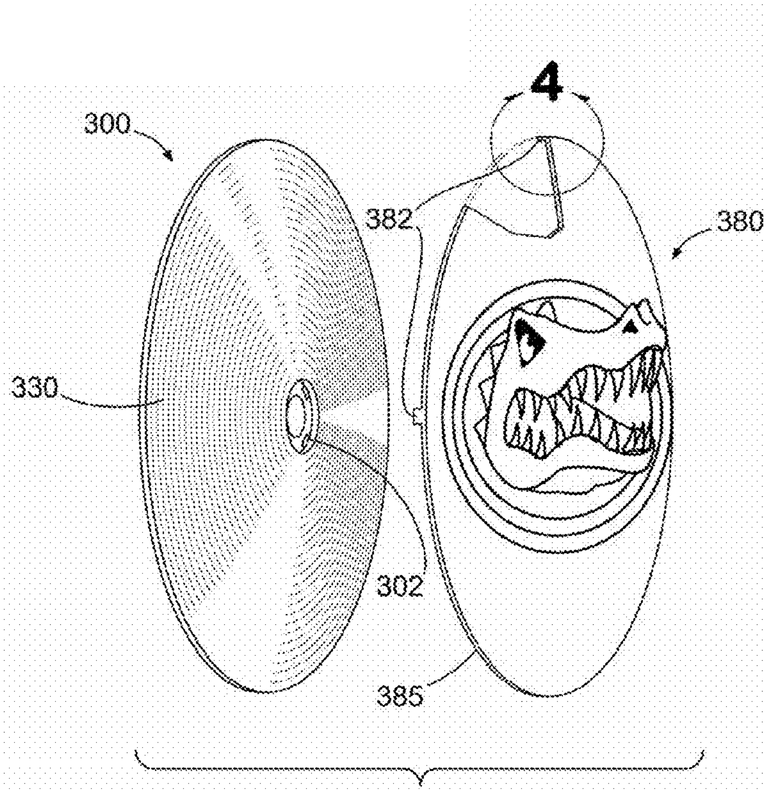
FIG. 13 is a perspective exploded view of an alternative embodiment of the wheel cover, showing a display member and a display cover in a non-attached position.
Figure 14:
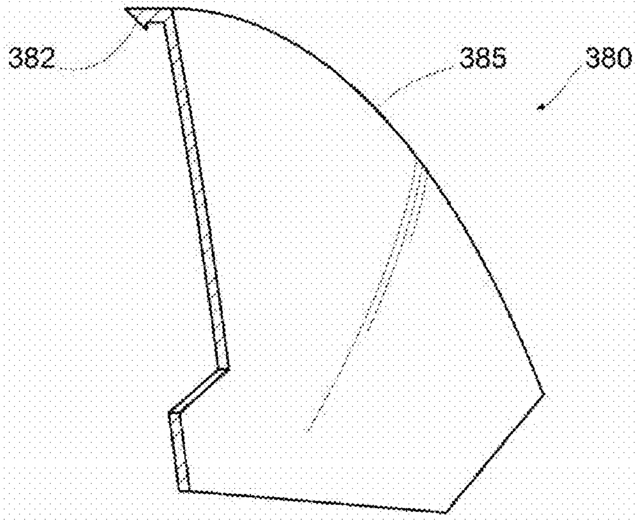
FIG. 14 is a partial perspective enlarged view of a portion of the display cover of FIG. 14.
Figure 15:
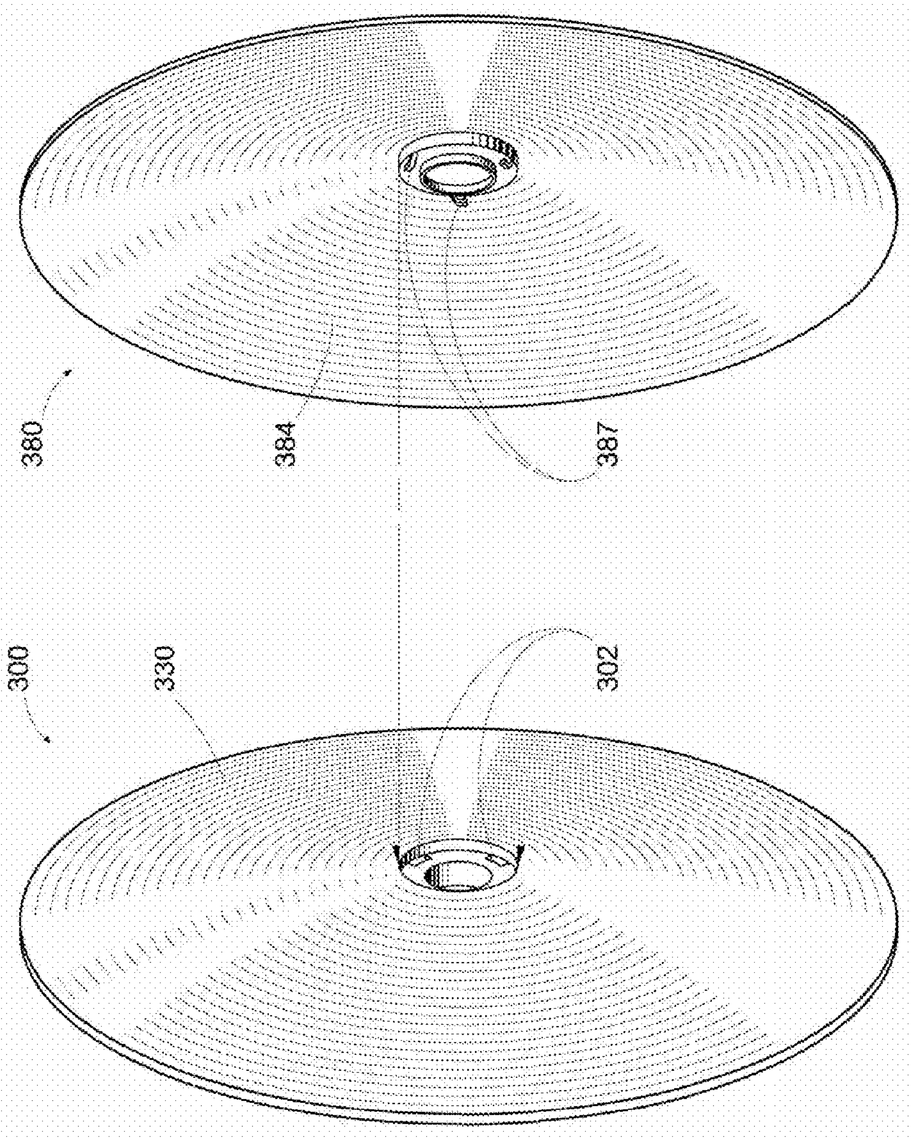
FIG. 15 is a perspective exploded view of an alternative embodiment of the wheel cover, showing a display member and a display cover in a non-attached position.

In one aspect, and as shown in FIGS. 13-15, the display cover 380 is a substantially rigid member made out of, or example, a thermoplastic, metal alloy, or the like. In one aspect, the display cover is configured to substantially conform to the shape of the display member. The rigid display cover 380 may be configured to "snap" onto the display member 300 or it may be configured to releasably adhere to the display surface 330 using a conventional hook and loop design (Velcro®), double sided tape, or any other known process.

Referring to FIGS. 13 and 14, in one aspect the display cover is configured to snap onto the display member using a plurality of peripheral hooks 385 positioned along the peripheral edge 382 of the display cover. The peripheral hooks 385 are configured to releasably engage at least a portion of the periphery of the display member.

In another aspect and referring to FIG. 15, the display member is equipped with a plurality of slots 302 located substantially adjacent and surrounding the center bore of the display member 300. In this aspect, the display cover 380 comprises a plurality of complementary male tabs 387 on its first surface 384 that are configured to releasable engage the slots 302 of the display member.

Figure 11:
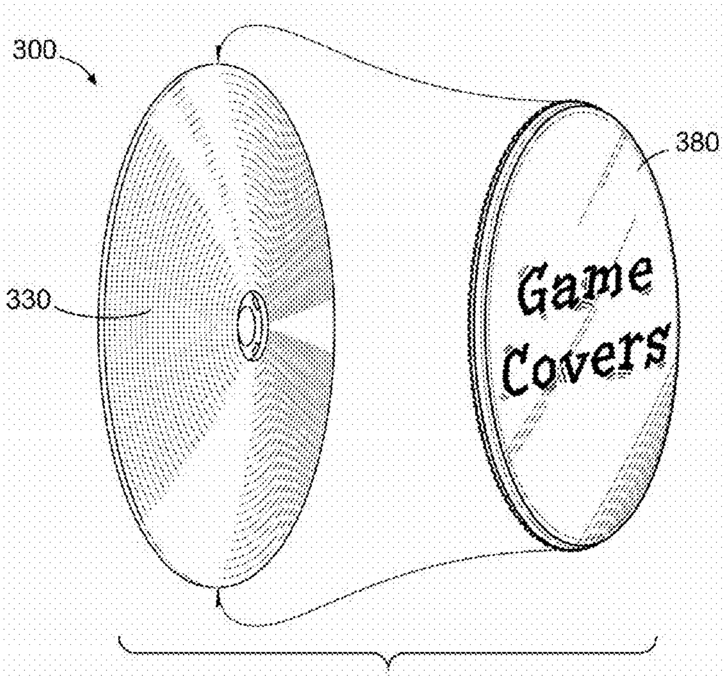
FIG. 11 is a perspective exploded view of an alternative embodiment of the wheel cover, showing a display member and a display cover in a non-attached position.
Figure 12:
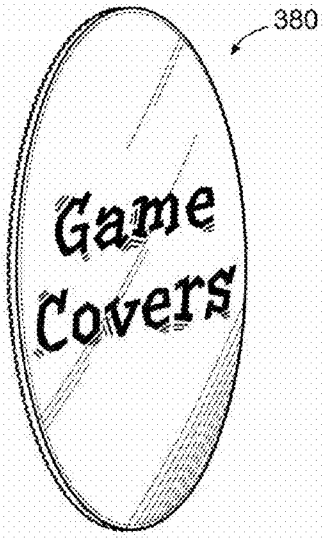
FIG. 12 is a perspective view of the wheel cover of FIG. 11, showing the display cover mounted thereon the display member.

Referring to FIGS. 11 and 12, in one aspect the display cover is substantially flexible and is configured to conform to the shape of the display member 300. In one aspect, the display cover contains an elastomeric substance at least adjacent its peripheral edge. In this aspect, as shown in FIG. 11, the display cover 380 can be stretched over the display member 300 and configured to releasably engage it. In one exemplary aspect, a portion of the display cover overlies the display surface and at least a portion of the peripheral edge 382 of the display cover 380 is proximate the rear face 305 of the display member 300. As such, portions of the display cover stretch over the display member and releasably engage portions of the peripheral surface of the display member.

In one exemplary aspect, wherein portions of the peripheral edge 382 of the display cover 380 are positioned proximate the rear face of the display member 300, portions of the rear face 305 of the display member are configured to engage portions of the peripheral edge of the display cover. For example, the peripheral edge 382 of the display cover 380 may comprise a conventional fastener, such as, but not limited to, snaps, buttons, hook and loop, and the like. As such, portions of the rear face 305 of the display member 300 may comprise a complimentary fastener.

In another exemplary aspect, the rear face 305 of the display member 300 may comprise a plurality of posts extending therefrom the rear face. As such, the peripheral edge of the display cover may comprise a plurality of holes complimentarily positioned such that, as the peripheral edge of the display cover 380 overlies the peripheral surface of the display member, the holes may engage the posts extending therefrom the rear face 305 of the display member, such that the display cover is held into position.

In yet another aspect, the peripheral edge of the display cover may comprise a draw string which, when the display cover 380 is positioned over the display member 300, could be drawn tight to hold the display cover into position over the display member.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims which follow, they are used only in a generic and descriptive sense, and not for the purposes of limiting the described invention.

What is claimed is:

1. A display assembly for a wheel of a motor vehicle, comprising:

a base member comprising:

a peripheral edge surface configured for a friction fit with a portion of the wheel of the motor vehicle such that the base member can be selectively and non-rotatably attached to the wheel of the motor vehicle;

a shaft member extending outwardly from a center portion of the base member;

a display member comprising a display surface and an opposed rear face, wherein the rear face of the display member comprises a pair of elongate L-beams defining channel portions with the rear face of the display member;

a coupler rotatably mounted to a distal portion of the shaft member configured to slidingly engage the rear face of the display member and selectively couple the display member to the shaft member, the coupler comprising a weight assembly configured to act as a counter weight to keep the display member in a substantially upright position when mounted on the wheel, whether or not the wheel is in motion, wherein the coupler defines an opening having edge portions configured to be received in one of the channel portions.

2. The display assembly of claim 1, further comprising a roller bearing mounted to a distal portion of the shaft member, wherein the coupler is mounted to the roller bearing.

3. The display assembly of claim 2, wherein the coupler comprising an enclosure configured for frictional receipt of the roller bearing.

4. The display assembly of claim 3, wherein the coupler further comprising a retainer band substantially circumferentially surrounding the enclosure for retention of the roller bearing within the enclosure.

5. The display assembly of claim 3, wherein the coupler is configured for selective mating relationship with a portion of the rear face of the display member.

6. The display assembly of claim 1, further comprising a display cover configured to selectively and releaseably overlie at least a portion of the display surface of the display member.

7. The display assembly of claim 6, wherein the display cover is configured to substantially conform to the shape of the display member.

8. The display assembly of claim 6, wherein the display cover has a peripheral edge, wherein a portion of the display cover overlies the display surface, and wherein at least a portion of the peripheral edge of the display cover is positioned proximate a rear face of the display member.

9. The display assembly of claim 8, further comprising a means for selectively mounting portions of the display cover to the rear face of the display member.

10. The display assembly of claim 9, wherein at least portions of the display cover are substantially flexible.

11. The display assembly of claim 5, wherein the weight assembly is spaced from the enclosure.

* * * * *